US009785647B1

(12) United States Patent
Petri et al.

(10) Patent No.: US 9,785,647 B1
(45) Date of Patent: Oct. 10, 2017

(54) FILE SYSTEM VIRTUALIZATION

(71) Applicant: Axcient, Inc., Mountain View, CA (US)

(72) Inventors: Robert Petri, Santa Clara, CA (US); Vito Caputo, San Mateo, CA (US)

(73) Assignee: Axcient, Inc., Mountain View, CA (US)

( * ) Notice: Subject to any disclaimer, the term of this patent is extended or adjusted under 35 U.S.C. 154(b) by 0 days.

(21) Appl. No.: 13/633,695

(22) Filed: Oct. 2, 2012

(51) Int. Cl.
*G06F 17/30* (2006.01)

(52) U.S. Cl.
CPC .............. *G06F 17/30238* (2013.01)

(58) Field of Classification Search
CPC ......... G06F 17/30153; G06F 17/30165; G06F 17/30197; G06F 17/30238; G06F 17/30917
USPC ............ 707/649, 823; 711/114, 170
See application file for complete search history.

(56) References Cited

U.S. PATENT DOCUMENTS

| 5,379,412 | A | 1/1995 | Eastridge et al. |
| 5,574,905 | A | 11/1996 | deCarmo |
| 5,860,107 | A | 1/1999 | Patel |
| 6,122,629 | A | 9/2000 | Walker et al. |
| 6,205,527 | B1 | 3/2001 | Goshey et al. |
| 6,233,589 | B1 | 5/2001 | Balcha et al. |
| 6,272,492 | B1 | 8/2001 | Kay |
| 6,411,985 | B1 | 6/2002 | Fujita et al. |
| 6,604,236 | B1 | 8/2003 | Draper et al. |
| 6,629,110 | B2 | 9/2003 | Cane et al. |
| 6,651,075 | B1 | 11/2003 | Kusters et al. |
| 6,971,018 | B1 | 11/2005 | Witt et al. |
| 7,024,581 | B1 | 4/2006 | Wang et al. |
| 7,085,904 | B2 | 8/2006 | Mizuno et al. |
| 7,266,655 | B1 | 9/2007 | Escabi, II et al. |
| 7,401,192 | B2 | 7/2008 | Stakutis et al. |
| 7,406,488 | B2 | 7/2008 | Stager et al. |
| 7,546,323 | B1 | 6/2009 | Timmins et al. |
| 7,620,765 | B1 | 11/2009 | Ohr et al. |
| 7,631,155 | B1 * | 12/2009 | Bono ............... G06F 3/0608 707/999.202 |
| 7,647,338 | B2 | 1/2010 | Lazier et al. |
| 7,676,763 | B2 | 3/2010 | Rummel |
| 7,730,425 | B2 | 6/2010 | de los Reyes et al. |
| 7,743,038 | B1 | 6/2010 | Goldick |
| 7,752,487 | B1 | 7/2010 | Feeser et al. |
| 7,769,731 | B2 | 8/2010 | O'Brien |

(Continued)

OTHER PUBLICATIONS

Final, Jan. 14, 2014, U.S. Appl. No. 13/030,073, filed Feb. 17, 2011.

(Continued)

*Primary Examiner* — James Trujillo
*Assistant Examiner* — John J Morris
(74) *Attorney, Agent, or Firm* — Carr & Ferrell LLP (57) ABSTRACT

Systems, methods, and media file system virtualization. Exemplary methods may include rendering a sparse file system and creating a block map for the sparse file system. The block map may include a map record for each file record included in the sparse file system. A map record may include extents for blocks associated with a file record, the map record providing a mapping between allocated block sectors for a file record in the sparse file system and corresponding blocks associated with one or more data sources.

17 Claims, 4 Drawing Sheets

(56) References Cited

U.S. PATENT DOCUMENTS

| | | |
|---|---|---|
| 7,797,582 B1 | 9/2010 | Stager et al. |
| 7,809,688 B2 | 10/2010 | Cisler et al. |
| 7,832,008 B1 | 11/2010 | Kraemer |
| 7,844,850 B2 | 11/2010 | Yasuzato |
| 7,873,601 B1 | 1/2011 | Kushwah |
| 7,930,275 B2 | 4/2011 | Chen et al. |
| 7,966,293 B1 | 6/2011 | Owara et al. |
| 8,037,345 B1 | 10/2011 | Iyer et al. |
| 8,046,632 B2 | 10/2011 | Miwa et al. |
| 8,060,476 B1 | 11/2011 | Afonso et al. |
| 8,099,391 B1 | 1/2012 | Monckton |
| 8,099,572 B1 | 1/2012 | Arora et al. |
| 8,117,163 B2 | 2/2012 | Brown et al. |
| 8,200,926 B1 | 6/2012 | Stringham |
| 8,224,935 B1 | 7/2012 | Bandopadhyay et al. |
| 8,244,678 B1 | 8/2012 | Hartland et al. |
| 8,244,914 B1 | 8/2012 | Nagarkar |
| 8,245,156 B2 | 8/2012 | Mouilleseaux et al. |
| 8,260,742 B2 | 9/2012 | Cognigni et al. |
| 8,279,174 B2 | 10/2012 | Jee et al. |
| 8,296,410 B1 | 10/2012 | Myhill et al. |
| 8,321,688 B2 | 11/2012 | Auradkar et al. |
| 8,332,442 B1 | 12/2012 | Greene |
| 8,352,717 B2 | 1/2013 | Campbell et al. |
| 8,381,133 B2 | 2/2013 | Iwema et al. |
| 8,402,087 B2 | 3/2013 | O'Shea et al. |
| 8,407,190 B2 | 3/2013 | Prahlad et al. |
| 8,412,680 B1 | 4/2013 | Gokhale et al. |
| 8,417,674 B2 | 4/2013 | Provenzano |
| 8,504,785 B1 | 8/2013 | Clifford et al. |
| 8,533,608 B1 | 9/2013 | Tantiprasut |
| 8,549,432 B2 | 10/2013 | Warner |
| 8,554,918 B1 | 10/2013 | Douglis |
| 8,572,337 B1 | 10/2013 | Gokhale et al. |
| 8,589,350 B1 | 11/2013 | Lalonde et al. |
| 8,589,913 B2 | 11/2013 | Jelvis et al. |
| 8,600,947 B1 | 12/2013 | Freiheit et al. |
| 8,601,389 B2 | 12/2013 | Schulz et al. |
| 8,606,752 B1 | 12/2013 | Beatty et al. |
| 8,639,917 B1 | 1/2014 | Ben-Shaul et al. |
| 8,676,273 B1 | 3/2014 | Fujisaki |
| 8,745,003 B1 | 6/2014 | Patterson |
| 8,767,593 B1 | 7/2014 | Allen et al. |
| 8,886,611 B2 | 11/2014 | Caputo |
| 8,924,360 B1 | 12/2014 | Caputo |
| 8,954,544 B2 | 2/2015 | Edwards |
| 9,104,621 B1 | 8/2015 | Caputo |
| 9,110,964 B1 | 8/2015 | Shilane et al. |
| 9,213,607 B2 | 12/2015 | Lalonde et al. |
| 9,235,474 B1 | 1/2016 | Petri et al. |
| 9,292,153 B1 | 3/2016 | Edwards et al. |
| 9,397,907 B1 | 7/2016 | Edwards et al. |
| 9,559,903 B2 | 1/2017 | Edwards |
| 9,705,730 B1 | 7/2017 | Petri et al. |
| 2001/0034737 A1 | 10/2001 | Cane et al. |
| 2001/0056503 A1 | 12/2001 | Hibbard |
| 2002/0124124 A1 | 9/2002 | Matsumoto et al. |
| 2002/0169740 A1 | 11/2002 | Korn |
| 2003/0011638 A1 | 1/2003 | Chung |
| 2003/0158873 A1 | 8/2003 | Sawdon et al. |
| 2003/0177293 A1 | 9/2003 | Bilak et al. |
| 2003/0208492 A1 | 11/2003 | Winiger et al. |
| 2004/0030852 A1 | 2/2004 | Coombs et al. |
| 2004/0044707 A1 | 3/2004 | Richard |
| 2004/0073560 A1 | 4/2004 | Edwards |
| 2004/0073677 A1 | 4/2004 | Honma et al. |
| 2004/0093474 A1 | 5/2004 | Lin et al. |
| 2004/0098423 A1 | 5/2004 | Chigusa et al. |
| 2004/0233924 A1 | 11/2004 | Bilak et al. |
| 2004/0260973 A1 | 12/2004 | Michelman |
| 2005/0010835 A1 | 1/2005 | Childs et al. |
| 2005/0027748 A1 | 2/2005 | Kisley |
| 2005/0114290 A1 | 5/2005 | Borthakur et al. |
| 2005/0154937 A1 | 7/2005 | Achiwa |
| 2005/0171979 A1 | 8/2005 | Stager et al. |
| 2005/0223043 A1 | 10/2005 | Randal et al. |
| 2005/0273654 A1 | 12/2005 | Chen et al. |
| 2005/0278583 A1 | 12/2005 | Lennert et al. |
| 2005/0278647 A1 | 12/2005 | Leavitt et al. |
| 2006/0013462 A1 | 1/2006 | Sadikali |
| 2006/0047720 A1 | 3/2006 | Kulkarni et al. |
| 2006/0064416 A1 | 3/2006 | Sim-Tang |
| 2006/0224636 A1 | 10/2006 | Kathuria et al. |
| 2007/0033301 A1 | 2/2007 | Aloni et al. |
| 2007/0038884 A1 | 2/2007 | Campbell et al. |
| 2007/0061385 A1 | 3/2007 | Clark et al. |
| 2007/0112895 A1 | 5/2007 | Ahrens et al. |
| 2007/0113032 A1 | 5/2007 | Kameyama et al. |
| 2007/0143497 A1 | 6/2007 | Kottomtharayil et al. |
| 2007/0168413 A1 | 7/2007 | Barletta et al. |
| 2007/0176898 A1 | 8/2007 | Suh |
| 2007/0179995 A1 | 8/2007 | Prahlad et al. |
| 2007/0180207 A1 | 8/2007 | Garfinkle |
| 2007/0198789 A1 | 8/2007 | Clark et al. |
| 2007/0204166 A1 | 8/2007 | Tome et al. |
| 2007/0208918 A1 | 9/2007 | Harbin et al. |
| 2007/0220029 A1 | 9/2007 | Jones et al. |
| 2007/0226400 A1 | 9/2007 | Tsukazaki |
| 2007/0233699 A1 | 10/2007 | Taniguchi et al. |
| 2007/0250302 A1 | 10/2007 | Xu et al. |
| 2007/0260842 A1* | 11/2007 | Faibish et al. ............... 711/170 |
| 2007/0276916 A1 | 11/2007 | McLoughlin et al. |
| 2007/0283017 A1 | 12/2007 | Anand et al. |
| 2007/0283343 A1 | 12/2007 | Aridor et al. |
| 2007/0288525 A1 | 12/2007 | Stakutis et al. |
| 2007/0288533 A1 | 12/2007 | Srivastava et al. |
| 2007/0294321 A1 | 12/2007 | Midgley et al. |
| 2008/0005468 A1* | 1/2008 | Faibish et al. ............... 711/114 |
| 2008/0010422 A1 | 1/2008 | Suzuki et al. |
| 2008/0027998 A1 | 1/2008 | Hara |
| 2008/0036743 A1 | 2/2008 | Westerman et al. |
| 2008/0082310 A1 | 4/2008 | Sandorfi et al. |
| 2008/0133622 A1 | 6/2008 | Brown et al. |
| 2008/0141018 A1 | 6/2008 | Tanaka et al. |
| 2008/0154979 A1 | 6/2008 | Saitoh et al. |
| 2008/0162590 A1 | 7/2008 | Kundu et al. |
| 2008/0162607 A1 | 7/2008 | Torii et al. |
| 2008/0201315 A1 | 8/2008 | Lazier et al. |
| 2008/0229050 A1 | 9/2008 | Tillgren |
| 2008/0307345 A1 | 12/2008 | Hart et al. |
| 2008/0307527 A1 | 12/2008 | Kaczmarski et al. |
| 2009/0089253 A1 | 4/2009 | Huang et al. |
| 2009/0094427 A1 | 4/2009 | Sano |
| 2009/0164527 A1 | 6/2009 | Spektor et al. |
| 2009/0185500 A1 | 7/2009 | Mower et al. |
| 2009/0216973 A1 | 8/2009 | Nakajima et al. |
| 2009/0248755 A1 | 10/2009 | Watanabe et al. |
| 2009/0276771 A1 | 11/2009 | Nickolov et al. |
| 2009/0309849 A1 | 12/2009 | Iwema et al. |
| 2009/0319653 A1 | 12/2009 | Lorenz et al. |
| 2009/0327964 A1 | 12/2009 | Mouilleseaux et al. |
| 2010/0042449 A1 | 2/2010 | Thomas |
| 2010/0077165 A1 | 3/2010 | Lu et al. |
| 2010/0095077 A1 | 4/2010 | Lockwood |
| 2010/0104105 A1 | 4/2010 | Schmidt et al. |
| 2010/0107155 A1 | 4/2010 | Banerjee et al. |
| 2010/0114832 A1 | 5/2010 | Lillibridge et al. |
| 2010/0165947 A1 | 7/2010 | Taniuchi et al. |
| 2010/0179941 A1 | 7/2010 | Agrawal et al. |
| 2010/0179973 A1 | 7/2010 | Carruzzo |
| 2010/0192103 A1 | 7/2010 | Cragun et al. |
| 2010/0205152 A1 | 8/2010 | Ansari et al. |
| 2010/0223368 A1 | 9/2010 | Runcie et al. |
| 2010/0228999 A1 | 9/2010 | Maheshwari et al. |
| 2010/0235831 A1 | 9/2010 | Dittmer |
| 2010/0262637 A1 | 10/2010 | Akagawa et al. |
| 2010/0268689 A1* | 10/2010 | Gates et al. ............... 707/649 |
| 2010/0318748 A1 | 12/2010 | Ko et al. |
| 2010/0325377 A1* | 12/2010 | Lango ............... G06F 17/30067 711/162 |
| 2010/0332454 A1 | 12/2010 | Prahlad et al. |
| 2011/0041004 A1 | 2/2011 | Miwa et al. |
| 2011/0047405 A1 | 2/2011 | Marowsky-Bree et al. |
| 2011/0055399 A1 | 3/2011 | Tung et al. |

(56) References Cited

U.S. PATENT DOCUMENTS

| | | |
|---|---|---|
| 2011/0055471 A1 | 3/2011 | Thatcher et al. |
| 2011/0055500 A1 | 3/2011 | Sasson et al. |
| 2011/0082998 A1 | 4/2011 | Boldy et al. |
| 2011/0106768 A1 | 5/2011 | Khanzode et al. |
| 2011/0154268 A1 | 6/2011 | Trent, Jr. et al. |
| 2011/0218966 A1 | 9/2011 | Barnes et al. |
| 2011/0238937 A1 | 9/2011 | Murotani et al. |
| 2011/0264785 A1 | 10/2011 | Newman et al. |
| 2011/0265143 A1 | 10/2011 | Grube et al. |
| 2011/0295811 A1 | 12/2011 | Cherkasova et al. |
| 2011/0307681 A1 | 12/2011 | Piry et al. |
| 2012/0013540 A1 | 1/2012 | Hogan |
| 2012/0065802 A1 | 3/2012 | Seeber et al. |
| 2012/0084501 A1 | 4/2012 | Watanabe et al. |
| 2012/0124307 A1 | 5/2012 | Ashutosh et al. |
| 2012/0130956 A1 | 5/2012 | Caputo |
| 2012/0131235 A1 | 5/2012 | Nageshappa et al. |
| 2012/0179655 A1 | 7/2012 | Beatty et al. |
| 2012/0204060 A1 | 8/2012 | Swift et al. |
| 2012/0210398 A1 | 8/2012 | Triantafillos et al. |
| 2012/0215743 A1 | 8/2012 | Triantafillos et al. |
| 2013/0018946 A1 | 1/2013 | Brown et al. |
| 2013/0024426 A1 | 1/2013 | Flowers et al. |
| 2013/0036095 A1 | 2/2013 | Titchener et al. |
| 2013/0091183 A1 | 4/2013 | Edwards et al. |
| 2013/0091471 A1 | 4/2013 | Gutt et al. |
| 2013/0125097 A1 | 5/2013 | Ebcioglu et al. |
| 2013/0166511 A1 | 6/2013 | Ghatty et al. |
| 2013/0234402 A1 | 9/2013 | Fietz |
| 2013/0238562 A1 | 9/2013 | Kumarasamy et al. |
| 2013/0238752 A1 | 9/2013 | Park et al. |
| 2013/0318046 A1 | 11/2013 | Clifford et al. |
| 2014/0006858 A1 | 1/2014 | Helfman et al. |
| 2014/0032498 A1 | 1/2014 | Lalonde et al. |
| 2014/0040580 A1 | 2/2014 | Kripalani |
| 2014/0047081 A1 | 2/2014 | Edwards |
| 2014/0052694 A1 | 2/2014 | Dasari et al. |
| 2014/0053022 A1 | 2/2014 | Forgette et al. |
| 2014/0089619 A1 | 3/2014 | Khanna et al. |
| 2014/0101113 A1 | 4/2014 | Zhang et al. |
| 2014/0149358 A1 | 5/2014 | Aphale et al. |
| 2014/0189680 A1 | 7/2014 | Kripalani |
| 2014/0201137 A1 | 7/2014 | Vibhor et al. |
| 2014/0201144 A1 | 7/2014 | Vibhor et al. |
| 2014/0244599 A1 | 8/2014 | Zhang et al. |
| 2014/0303961 A1 | 10/2014 | Leydon et al. |
| 2015/0046404 A1 | 2/2015 | Caputo |
| 2015/0095691 A1 | 4/2015 | Edwards |
| 2016/0054911 A1 | 2/2016 | Edwards et al. |
| 2016/0055062 A1 | 2/2016 | Petri et al. |
| 2016/0105312 A1 | 4/2016 | Edwards |
| 2016/0110261 A1 | 4/2016 | Parab et al. |
| 2016/0162349 A1 | 6/2016 | Edwards et al. |
| 2016/0182170 A1 | 6/2016 | Daoura et al. |
| 2017/0075719 A1 | 3/2017 | Scallan et al. |
| 2017/0090786 A1 | 3/2017 | Parab et al. |
| 2017/0177452 A1 | 6/2017 | Parab et al. |

OTHER PUBLICATIONS

Notice of Allowance, Sep. 12, 2013, U.S. Appl. No. 13/437,738, filed Apr. 2, 2012.
Final, Dec. 24, 2013, U.S. Appl. No. 13/363,234, filed Jan. 31, 2012.
Non-Final, Jul. 28, 2014, U.S. Appl. No. 13/671,498, filed Nov. 7, 2012.
Notice of Allowance, Sep. 26, 2014, U.S. Appl. No. 12/895,275, filed Sep. 30, 2010.
Non-Final Office Action, Oct. 1, 2014, U.S. Appl. No. 13/030,073, filed Feb. 17, 2011.
Notice of Allowance, Sep. 15, 2014, U.S. Appl. No. 13/363,234, filed Jan. 31, 2012.
Notice of Allowance, Oct. 20, 2014, U.S. Appl. No. 13/570,161, filed Aug. 8, 2012.
Corrected Notice of Allowability, Nov. 3, 2014, U.S. Appl. No. 13/570,161, filed Aug. 8, 2012.
Non-Final Office Action, Nov. 5, 2014, U.S. Appl. No. 13/789,578, filed Mar. 7, 2013.
Li et al., "Efficient File Replication," U.S. Appl. No. 13/671,498, filed Nov. 7, 2012.
Non-Final Office Action, Jun. 17, 2015, U.S. Appl. No. 13/889,164, filed May 7, 2013.
Advisory Action, May 12, 2015, U.S. Appl. No. 13/671,498, filed Nov. 7, 2012.
Advisory Action, Jun. 10, 2015, U.S. Appl. No. 13/671,498, filed Nov. 7, 2012.
Final Office Action, May 27, 2015, U.S. Appl. No. 13/789,565, Mar. 7, 2013.
Final Office Action, Jun. 3, 2015, U.S. Appl. No. 13/789,578, filed Mar. 7, 2013.
Advisory Action, Jun. 10, 2015, U.S. Appl. No. 14/037,231, filed Sep. 25, 2013.
Non-Final Office Action, Jul. 9, 2015, U.S. Appl. No. 14/037,231, filed Sep. 25, 2013.
Notice of Allowance, Jun. 5, 2015, U.S. Appl. No. 14/534,017, filed Nov. 5, 2014.
Non-Final Office Action, Jul. 27, 2015, U.S. Appl. No. 14/564,082, filed Dec. 8, 2014.
Caputo, "Systems and Methods for Restoring a File", U.S. Appl. No. 12/895,275, filed Sep. 30, 2010.
Corrected Notice of Allowability, Dec. 30, 2014, U.S. Appl. No. 13/570,161, filed Aug. 8, 2012.
Non-Final Office Action, Nov. 12, 2014, U.S. Appl. No. 14/037,231, filed Sep. 25, 2013.
Notice of Allowance, Sep. 8, 2015, U.S. Appl. No. 14/037,231, filed Sep. 25, 2013.
Notice of Allowance, Oct. 22, 2015, U.S. Appl. No. 13/030,073, filed Feb. 17, 2011.
Non-Final Office Action, Oct. 30, 2015, U.S. Appl. No. 13/789,565, filed Mar. 7, 2013.
Notice of Allowance, Oct. 21, 2015, U.S. Appl. No. 13/789,578, filed Mar. 7, 2013.
Non-Final Office Action, Jun. 1, 2016, U.S. Appl. No. 15/019,951, filed Feb. 9, 2016.
Advisory Action, Jun. 8, 2016, U.S. Appl. No. 14/564,082, filed Dec. 8, 2014.
Non-Final Office Action, Jun. 28, 2016, U.S. Appl. No. 13/671,498, filed Nov. 7, 2012.
Final Office Action, Jul. 26, 2016, U.S. Appl. No. 13/889,164, filed May 7, 2013.
Non-Final Office Action, Aug. 10, 2016, U.S. Appl. No. 14/522,527, filed Oct. 23, 2014.
Non-Final Office Action, Oct. 5, 2016, U.S. Appl. No. 14/970,480, filed Dec. 15, 2015.
Notice of Allowance, Oct. 18, 2016, U.S. Appl. No. 14/564,082, filed Dec. 8, 2014.
Advisory Action, Oct. 26, 2016, U.S. Appl. No. 13/889,164, filed May 7, 2013.
Final Office Action, Oct. 27, 2016, U.S. Appl. No. 14/977,581, filed Dec. 21, 2015.
Corrected Notice of Allowability, Dec. 5, 2016, U.S. Appl. No. 14/564,082, filed Dec. 8, 2014.
Non-Final Office Action, Dec. 9, 2016, U.S. Appl. No. 15/019,951, filed Feb. 9, 2016.
Final Office Action, Dec. 27, 2016, U.S. Appl. No. 13/671,498, filed Nov. 7, 2012.
Advisory Action, Dec. 30, 2016, U.S. Appl. No. 13/889,164, filed May 7, 2013.
Advisory Action, Feb. 7, 2017, U.S. Appl. No. 14/977,581, filed Dec. 21, 2015.
Final Office Action, Feb. 9, 2017, U.S. Appl. No. 14/522,527, filed Oct. 23, 2014.
Advisory Action, Feb. 13, 2017, U.S. Appl. No. 15/019,951, filed Feb. 9, 2016.
Non-Final Office Action, Mar. 22, 2017, U.S. Appl. No. 14/864,850, filed Sep. 24, 2015.

(56) References Cited

OTHER PUBLICATIONS

Advisory Action, Mar. 30, 2017, U.S. Appl. No. 14/977,581, filed Dec. 21, 2015.
Notice of Allowance, Apr. 6, 2017, U.S. Appl. No. 13/889,164, filed May 7, 2013.
Advisory Action, Apr. 20, 2017, U.S. Appl. No. 13/671,498, filed Nov. 7, 2012.
Advisory Action, Apr. 25, 2017, U.S. Appl. No. 14/522,527, filed Oct. 23, 2014.
Non-Final, Feb. 19, 2013, U.S. Appl. No. 13/437,738, filed Apr. 2, 2012.
Non-Final, Apr. 30, 2013, U.S. Appl. No. 13/363,234, filed Jan. 31, 2012.
Final, Dec. 27, 2012, U.S. Appl. No. 12/895,275, filed Sep. 30, 2010.
Non-Final Office Action, dated Jun. 14, 2017, U.S. Appl. No. 15/360,836, filed Nov. 23, 2016.
Non-Final Office Action, dated Jun. 29, 2017, U.S. Appl. No. 15/019,951, filed Feb. 9, 2016.
Final Office Action, dated Jul. 24, 2017, U.S. Appl. No. 14/864,850, filed Sep. 24, 2015.
Non-Final Office Action, dated Jul. 26, 2017, U.S. Appl. No. 14/977,581, filed Dec. 21, 2015.

\* cited by examiner

FILE SYSTEM VIRTUALIZATION

FIELD OF THE INVENTION

The present technology may be generally described as providing systems and methods for file system virtualization. More specifically, but not by way of limitation, the present technology may allow for the creation of virtual disks that are utilizable by virtual machines. These virtual disks may comprise a sparse file system that is mountable by a virtual machine. That is, the file system includes allocated block sectors that correspond to blocks of file records. These allocated block sectors are not populated with actual block data but remain sparse. The present technology may provide access to actual block data of files using a block map that provides a mapping between the allocated block sectors of the sparse file system and actual blocks of files in a data source(s). Thus, a sparse file system may be used by a virtual machine to obtain actual data blocks (e.g., files) without requiring the virtual machine to create a fully populated file system.

BACKGROUND

Customer data for physical systems may be backed up to a backing store, as is common with remote backup systems. Mirrors and incremental files may be captured periodically. These backup files may be used to recreate files of the physical system at a later point in time. Backup files captured over time may be used to recreate the file system of the physical system at an arbitrary point in time in the past (e.g., prior to the failure event).

According to known methods, to access blocks of files from a backing store, a physical or virtual disk is partitioned and formatted. Files from a backing store are then populated onto the disk. The disk is then mounted for use. Therefore, when an end user desires to obtain only a part of a file, or even a selected file or group of files, the end user recreates the entire physical disk, which is an onerous task given the desired outcome.

SUMMARY OF THE PRESENT TECHNOLOGY

According to some embodiments, the present technology may be directed to methods that comprise: (a) rendering a sparse file system; and (b) creating a block map for the sparse file system, the block map comprising mappings between allocated block sectors of file records of the sparse file system and corresponding disperse blocks stored in a data source.

In some embodiments, the present technology may be directed to systems that comprise: (a) at least one server comprising: a memory that includes executable instructions and a processor executing the instructions, the instructions comprising: (i) a rendering module that renders a sparse file system; and (ii) an extent mapper that creates a block map for the sparse file system, the block map comprising a map record for each file record included in the sparse file system, a map record comprising extents for blocks associated with a file record, the map record providing a mapping between allocated block sectors for a file record and corresponding blocks associated with a data source.

According to some embodiments, the present technology may be directed to methods that comprise: (a) requesting blocks from a virtual disk, the blocks corresponding to a file that is to be assembled; and (b) assembling the file by: (i) evaluating a block map to obtain the requested blocks from any of a data source and a backup data source, the block map providing a mapping between allocated block sectors of the sparse file system and corresponding block data in the data source; (ii) for blocks not included in the block map, obtaining blocks not included in the block map from a sparse file system directly; and (iii) assembling the obtained blocks to assemble the file (iii) assembling the obtained blocks to assemble the file.

According to some embodiments, the present technology may be directed to a non-transitory machine-readable storage medium having embodied thereon a program. In some embodiments the program may be executed by a machine to perform a method. The method may comprise: (a) requesting blocks from a virtual disk, the blocks corresponding to a file that is to be assembled; and (b) assembling the file by: (i) evaluating a block map to obtain the requested blocks from a data source, the block map providing a mapping between allocated block sectors of the sparse file system and corresponding block data in the data source; (ii) for blocks not included in the block map, obtaining blocks not included in the block map from a sparse file system directly; and (iii) assembling the obtained blocks to assemble the file.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology allows for efficient retrieval of blocks from data sources such as files and/or backing stores without the need to recreate an entire file system that includes the blocks. More specifically, but not by way of limitation, the present technology allows virtual or physical machines to request blocks from various data sources.

Rather than recreating the entire file system, a sparse file system may be created from known metadata that includes extents for blocks. The extents for a block may comprise a file, offset, and/or length (e.g., size). The blocks may be associated with file records for files. In some embodiments, the metadata of the backing store contains two types of information, full mirror files and incremental file fragments. The metadata maps to both of these types of files.

The sparse file system may be created from a spare file that has been formatted with a particular file system such as new technology file system (NTFS), although other file system types that would be known to one of ordinary skill in the art may also likewise be utilized in accordance with the present technology.

Using the metadata that comprises extents for the blocks, spaces for file records may be allocated to the sparse file system in such a way that appropriate spaces for file records are established in the file system without actually writing the data blocks for the file records into the file system. Stated otherwise, the sparse file system may comprise allocated block sectors that remain sparse (e.g., do not include actual data).

The present technology also creates a block map using the metadata. The block map provides a mapping between allocated block sectors of the sparse file system and the actual (e.g., corresponding) blocks stored in one or more data sources. In some instances the data sources may comprise backup data sources. Therefore, corresponding blocks may be stored in mirrors (also referred to as core files or snapshots) or incremental files that comprise the backup data source. It is noteworthy that in some embodiments, the backup data source may comprise distributed hash tables that are provisioned within a cloud.

When data blocks are requested by a physical or virtual machine, in lieu of writing all data blocks directly into the file system, the block map may be consulted to obtain the desired blocks from various data sources such as files and/or backup trees. Advantageously, blocks representing a file or a portion of a file, as they existed at an arbitrary point in time, may be obtained without needing to recreate the entire file system to which the blocks and files belong. These and other advantages of the present technology will be discussed in greater detail herein.

Figure 1:
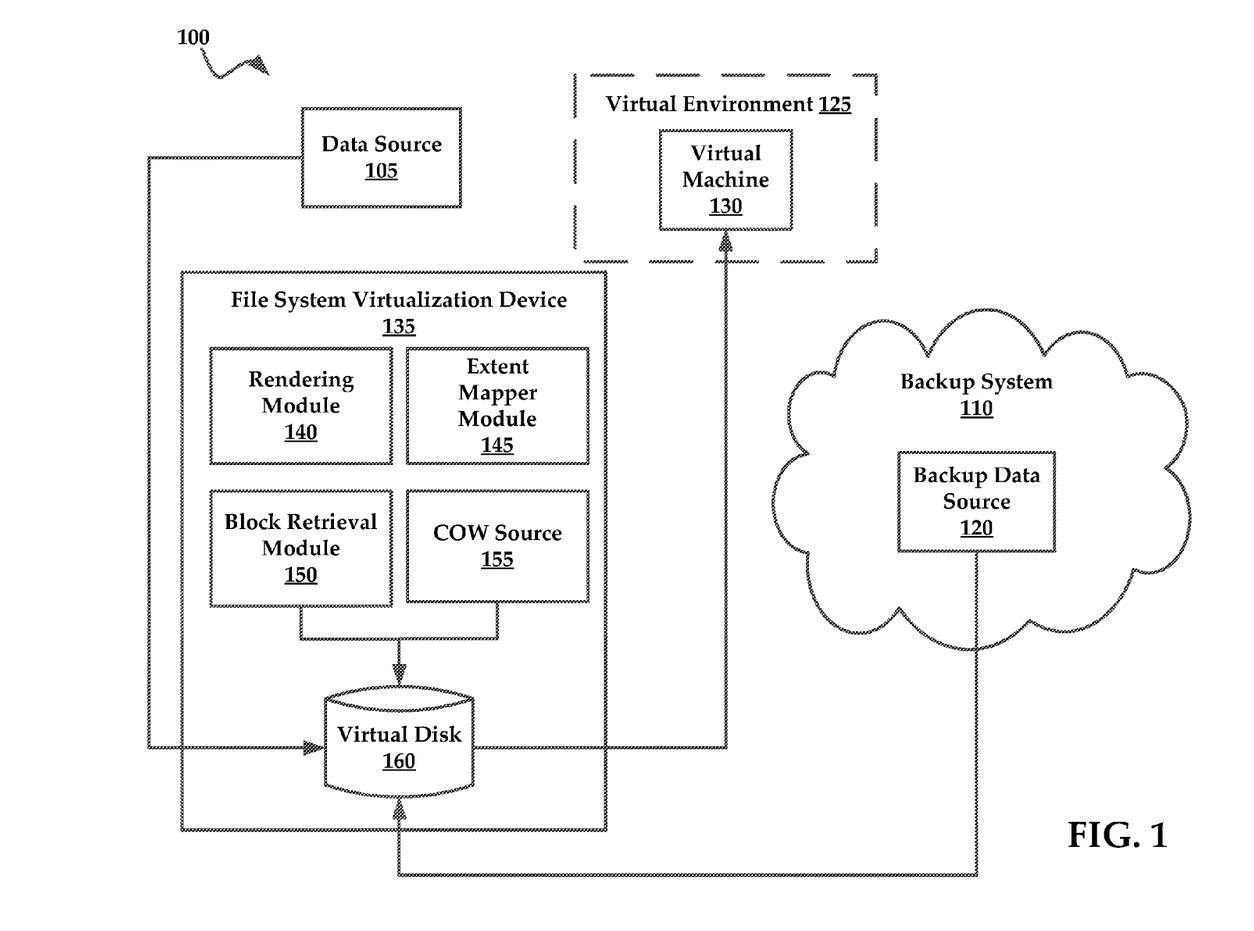
FIG. 1 is a block diagram of an exemplary architecture in which embodiments of the present technology may be practiced.

Referring now to the drawings, and more particularly, to FIG. 1, which includes a schematic diagram of an exemplary architecture 100 for practicing the present invention. Architecture 100 may include one or more data sources such as data source 105. The data source(s) 105 may comprise a file system of a computing device that includes files that comprise data blocks.

Generally speaking, the backup system 110 provides remote backup services for files that reside on a physical system such as an end user computing system (not shown). In some instances, the backup system 110 may be implemented within a cloud-based computing environment. In general, a cloud-based computing environment is a resource that typically combines the computational power of a large model of processors and/or that combines the storage capacity of a large model of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of servers, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

In greater detail, the backup system 110 may include one or more VPN devices adapted to receive information from the gateway router of the end user computing system. In some embodiments, the repository may include an Ethernet switch operatively coupling the VPN devices to a remote backup application server adapted execute at least a portion of methods for restoring files. The backup system 110 may also include disaster recovery servers, physical media input servers, and one or more virus scanning servers. It will be understood that the primary storage devices for the backup system 110 may include, for example, RAID redundant storage servers, although other types of servers that would be known to one of ordinary skill in the art with the present disclosure before them are likewise contemplated for use in accordance with the present invention.

According to some embodiments, the backup system 110 may comprise various data sources such as backup data source (or data source) 120. The backup data source 120 may comprise various files such as mirrors (also known as core files and/or snapshots), incremental files (both forward and reverse differentials), or other data structures such as distributed hash tables. The present technology may utilize any backup data source that would be known to one of ordinary skill in the art with the present disclosure before them. The backup data sources may exist on a single backup device, such as a failover appliance (which can be local or remotely positioned relative to an end user computing system) or they may be distributed over a plurality of systems which are arranged in a cloud configuration.

Additionally, the architecture 100 may comprise a virtual environment 125 that comprises a virtual machine 130. The virtual machine 130 may comprise any virtual instantiation of a computing device that utilizes any desired operating system. One of ordinary skill in the art would be well versed in various functional and operational details regarding the use of a virtual machine. Therefore, a detailed discussion regarding these features will be omitted so as not to obscure the advantages of the present technology described herein.

According to some embodiments, the architecture 100 may comprise a file system virtualization device 135. The file system virtualization device 135 may comprise a rendering module 140, an extent mapper module 145, a block retrieval module 150, and a copy on write (COW) source 155, which are each stored in memory and/or a physical storage media (e.g., disk, RAID, distributed hash table, etc.) and executable by a processor of the file system virtualization device 135. It is noteworthy that the file system virtualization device 135 may include additional or fewer modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the file system virtualization device 135 may include separately configured servers. The file system virtualization device 135 may also be integrated within the virtual environment 125.

Prior to the virtual machine 130 requesting blocks from a virtual disk, such as virtual disk 160, the file system virtualization device 135 may be utilized to create a sparse file system and a block map for the virtual disk 160. Traditionally, data sources may contain files that are comprised of actual blocks of data. Additionally, blocks of data may be obtained from mirrors and/or incremental files, such as those stored on the backup data source 120. Files may be recreated from the mirrors and/or incremental files as they existed at an arbitrary point in time in the past. Using the obtained mirrors and/or increments, a file system may be created by formatting a target disk image with a file system, such as NTFS. Again, the target disk image may be provided on either a physical or virtual disk, which may be provisioned with a cloud.

After formatting the target disk image, the files may be walked to rebuild the file system of the physical device. Additional details regarding systems and methods for restoring a file are included in U.S. patent application Ser. No. 12/895,275, filed Sep. 30, 2010, entitled "Systems and Methods for Restoring a File," now U.S. Pat. No. 8,924,360, issued Dec. 30, 2014, which is hereby incorporated by reference herein in its entirety including all reference cited therein. Advantageously, rather than using traditional methods for obtaining blocks or files, the present technology may create sparse file systems and corresponding block maps, also referred to as extent maps.

The rendering module 140 may be executed to create a new file system in a sparse file. Again, this file system could include NTFS or any other file system desired. Generally, the sparse file may be created from an analysis of metadata obtained from about the data source 105 and/or the backup data source 120. The metadata may be utilized to lay out a file system and extents for blocks (e.g., allocated block sectors) within the file system. An extent for a block may be understood to include an identification of the file to which the block belongs, an offset, and a length (e.g., size) for a particular block of data. Again, the block of data may be part of a file record. Moreover, a file record may comprise a plurality of blocks. It will be understood that most file systems utilize specific sector sizes and block sizes, such that blocks rarely cross boundaries within the file system.

In contrast with traditional methods, the rendering module 140 may not write actual data into the sparse file system. The rendering module 140 may allocate block sectors for blocks of file records which are to be included in the file system. The allocation of block sectors for blocks of each file record that is to be included in the file system, using metadata obtained from the backup data source 120, produces a sparse file system. The sparse file system resides on the virtual disk 160. While the target disk image has been described as residing in a virtual disk, the target disk image may also reside on a physical disk.

Additionally, the extent mapper module 145 may be executed to create a block map for the sparse file system. Generally, the block map is used to map allocated block sectors included in the sparse file system to their actual blocks stored in the data source 105, for example in files. Thus, the allocated block sectors of the sparse file system are "sparse" inasmuch as the blocks are merely referenced by their extents in the sparse file system. That is, the sparse file system knows locations of blocks based upon their extents, but the actual data included in those blocks remains sparse or unknown to the file system. The allocated block sectors of the sparse file system are functionally placeholders that represent the location and size of actual block data.

The block map links the actual blocks of data on the data source 105 to the sparse file system using the same extent metadata used to create the sparse file system. More specifically, the block map may comprise a plurality of map records that correspond to file records. The file records correspond to files that are to be included in the sparse file system. Thus, a map record contains a mapping of blocks for a specific file record to corresponding blocks stored in the data source 105.

Once the sparse file system and the block map have been created, the virtual disk 160, which includes the sparse virtual file system, may be mounted by the virtual machine 130. Even though the sparse system file does not include actual block data, the virtual machine 130 may utilize the virtual disk 160 in the same manner as a traditional disk that includes all corresponding block data.

When the virtual machine 130 desires to obtain blocks from virtual disk 160, for example when restoring a file, a COW source 155 may first be used to process the request. Initially, partially written requests may be fulfilled by the COW source 155. If the COW source 155 is unable to fulfill the block request, the block request may be subsequently passed to the block retrieval module 150 for fulfillment.

The block retrieval module 150 may receive the block request and read the block map to determine mappings for the requested blocks. Once the mappings have been determined, the block retrieval module 150 may obtain the blocks from the appropriately mapped backup data source(s), such as the data source 105.

For blocks that do not fall within the block map, the block retrieval module 150 may obtain the block data from the sparse file system and may in some instances include file system metadata. According to some embodiments, the metadata associated with the backup data source 120 may be evaluated to determine the location of blocks included in the request.

Blocks obtained from the data source 105 may be assembled together to recreate a file, or at least a portion of a file. Additionally, these blocks obtained from the data source 105 may be combined with blocks obtained from the backup data source 120. The assembled blocks may be served by the virtual machine 130 without the requirement to move the data into the sparse file system, which may result in the mutation of the block data.

Although not shown, the virtual machine 130 may utilize a virtual device driver to open files, cache data, and serve block requests to provide nearly instant failover for the data source 105 using a relatively small virtual disk creation operation as described above.

Figure 2:
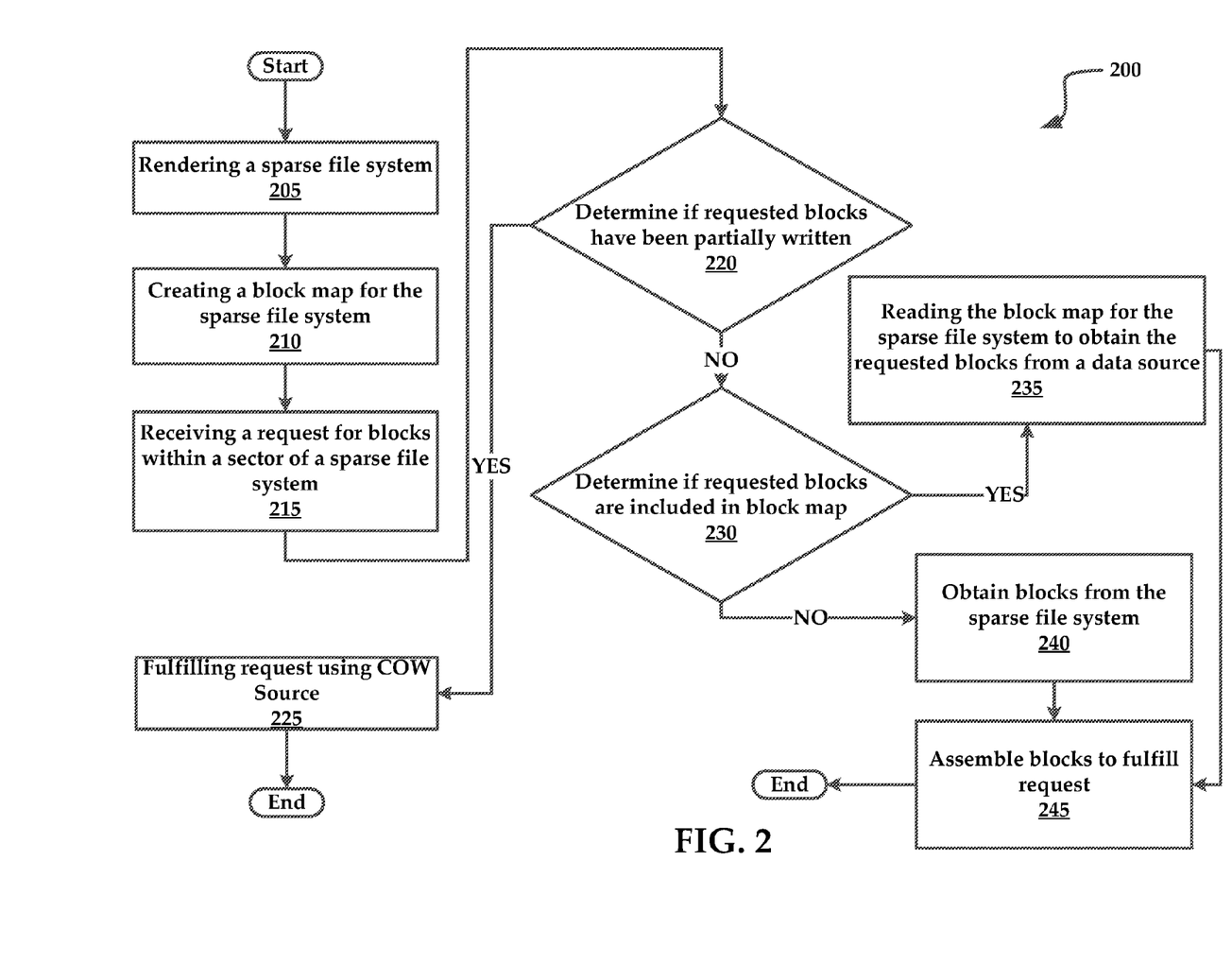
FIG. 2 is a flowchart of an exemplary method of file system virtualization.

FIG. 2 is a flowchart of an exemplary method 200 of file system virtualization. The method 200 may comprise a step 205 of rendering a sparse file system according to the processes previously described. The method may also comprise a step 210 of creating a block map for the sparse file system. Again, the block map may comprise mappings between allocated block sectors of file records of the sparse file system and corresponding disperse blocks stored in a data source.

Next, the method may comprise a step 215 of receiving a request for blocks, which may comprise a request for a file from a virtual disk. Again, a file is comprised of one or more blocks of data. In some instances, the request may explicitly request data blocks from a particular location on the virtual disk.

In response to the request, the method may comprise a step 220 of determining if the requested blocks have been at least partially written. If so, the method may comprise a step 225 of fulfilling the block request using a COW source. If the requested blocks have not been partially written, the method may comprise a step 230 of determining if the requested blocks are included in the block map.

If the requested blocks are included in the block map, method may comprise a step 235 of reading the block map for the sparse file system to obtain the requested blocks from a data source(s). If the requested blocks are not included in the block map, the method may comprise a step 240 of obtaining the requested blocks from the sparse file system. The method may comprise a step 245 of assembling the requested blocks to fulfill the request.

Figure 3:
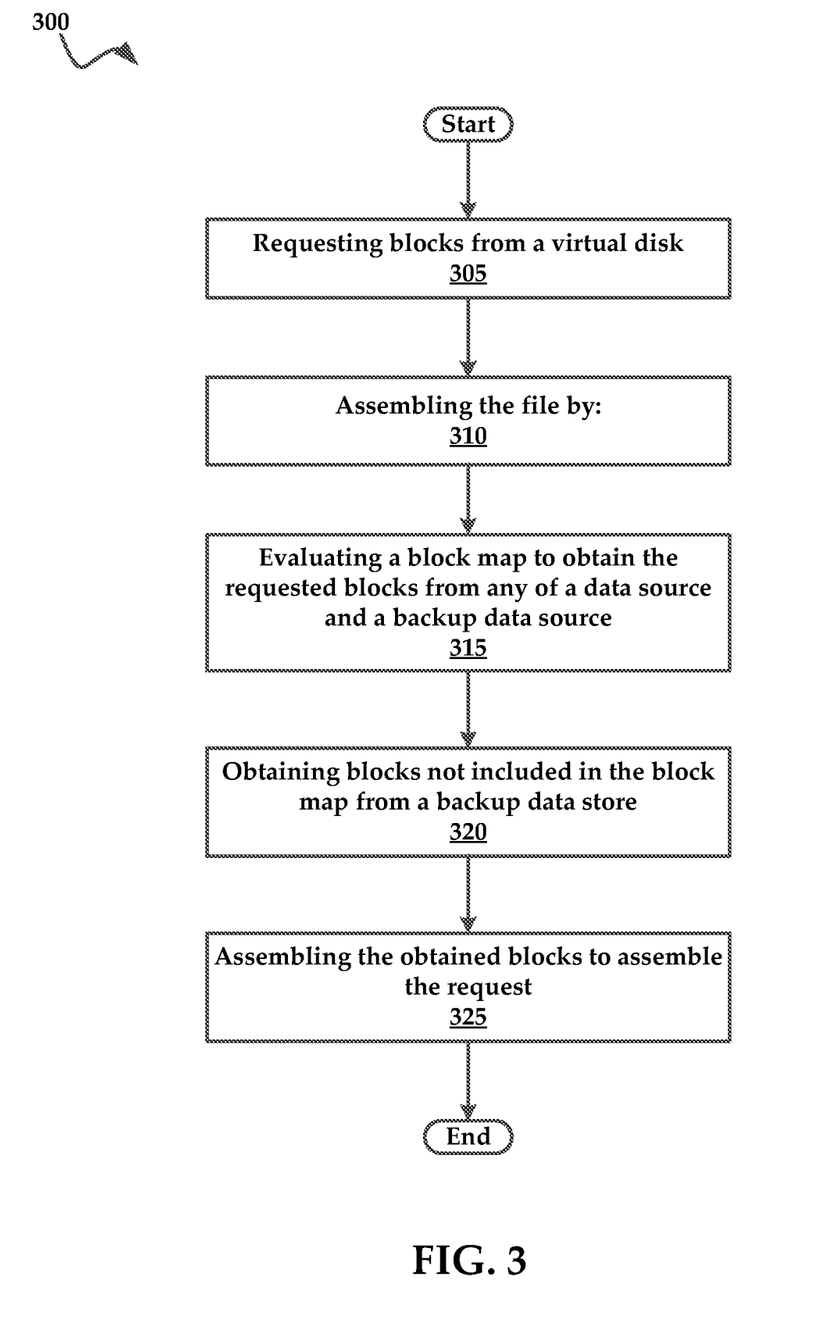
FIG. 3 is a flowchart of an exemplary method for assembling a file using a spares file system and block map.

FIG. 3 is a flowchart of an exemplary method 300 for assembling a file using a sparse file system and a block map. The method may comprise a step 305 of requesting blocks from a sparse file system. As mentioned previously, the blocks may correspond to a file that is to be assembled.

Next, the method may comprise a step 310 of assembling the file by executing a sub-step 315 of evaluating a block map to obtain the requested blocks from a data source. In some instances, the block map may provide a mapping between allocated block sectors of the sparse file system and corresponding block data in the data source.

Advantageously, for blocks not included in the block map, the method may comprise a sub-step 320 of obtaining blocks not included in the block map from the sparse file system. Thus, mapped blocks may be gathered from a data source such as a current file(s), as well as a backup data source, while unmapped blocks may be gathered from the sparse file system. In some instances, these non-mapped blocks are fulfilled by the sparse file system which contains only file system metadata blocks. In contrast, blocks that have been written at any time through the virtual disk system are stored in the COW and provided by the COW on any future request for the block. This applies to both blocks in the sparse file system and mapped blocks.

The method may also comprise a sub-step 325 of assembling the obtained blocks to assemble the file. Again, in some embodiments the assembled blocks may comprise blocks obtained from only a data source such as current files. Alternatively, the assembled blocks may comprise blocks obtained from only the backup data source. In other embodiments, the assembled blocks may comprise blocks obtained from a data source(s) and/or backup data source (s).

Figure 4:
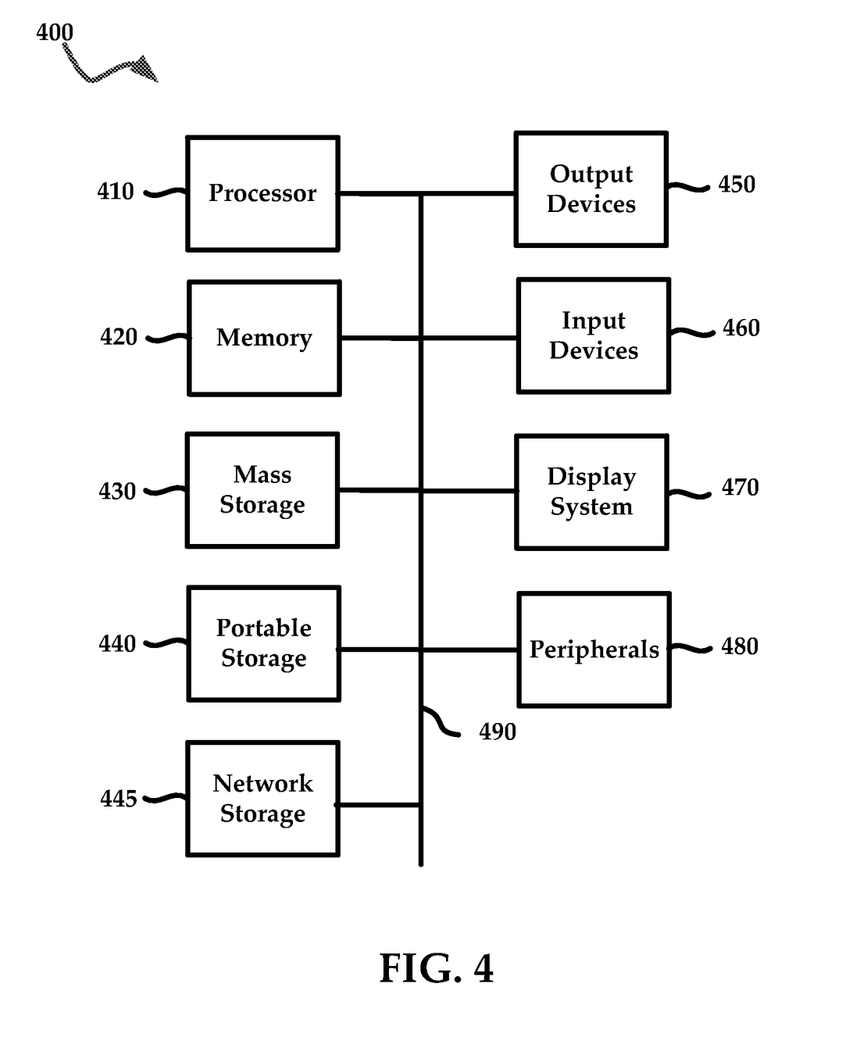
FIG. 4 illustrates an exemplary computing system that may be used to implement embodiments according to the present technology.

FIG. 4 illustrates an exemplary computing system 400 that may be used to implement an embodiment of the present technology. The computing system 400 of FIG. 4 includes one or more processors 410 and memory 420. Main memory 420 stores, in part, instructions and data for execution by processor 410. Main memory 420 can store the executable code when the system 400 is in operation. The system 400 of FIG. 4 may further include a mass storage device 430, portable storage medium drive(s) 440, output devices 450, user input devices 460, a graphics display 470, and other peripheral devices 480. The system 400 may also comprise network storage 445.

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device 440, and graphics display 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present technology for purposes of loading that software into main memory 420.

Portable storage device 440 operates in conjunction with a portable non-volatile storage medium, such as a floppy disk, compact disk or digital video disc, to input and output data and code to and from the computing system 400 of FIG. 4. The system software for implementing embodiments of the present technology may be stored on such a portable medium and input to the computing system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Graphics display 470 may include a liquid crystal display (LCD) or other suitable display device. Graphics display 470 receives textual and graphical information, and processes the information for output to the display device.

Peripherals 480 may include any type of computer support device to add additional functionality to the computing system. Peripheral device(s) 480 may include a modem or a router.

The components contained in the computing system 400 of FIG. 4 are those typically found in computing systems that may be suitable for use with embodiments of the present technology and are intended to represent a broad category of such computer components that are well known in the art. Thus, the computing system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

It is noteworthy that various modules and engines may be located in different places in various embodiments. Modules and engines mentioned herein can be stored as software, firmware, hardware, as a combination, or in various other ways. It is contemplated that various modules and engines can be removed or included in other suitable locations besides those locations specifically disclosed herein. In various embodiments, additional modules and engines can be included in the exemplary embodiments described herein.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising:
    storing a backup of a file system in a backup data source;
    receiving a request to render a portion of file records of the file system stored in the backup data source;
    rendering a sparse file system by allocating block sectors for blocks of the portion of the file records in a formatted sparse file, without having to render the file system entirely; and
    creating a block map for the sparse file system, the block map comprising mappings between allocated block sectors of file records of the sparse file system and corresponding disperse blocks stored in all the backup data source, wherein all block sectors for blocks in the formatted sparse file are allocated without writing data associated with the file records into the allocated block sectors.

2. The method according to claim 1, wherein the allocated block sectors are placeholders that represent a location and size of actual block data.

3. The method according to claim 2, wherein block sectors are allocated using metadata that comprises extents for blocks included in the portion of file records.

4. The method according to claim 1, wherein the block map comprises a map record for each file record included in the sparse file system, the map record comprising extents for blocks associated with a file record.

5. The method according to claim 1, further comprising:
    receiving a request for blocks within a sector of the sparse file system; and
    obtaining the requested blocks by:
        reading the block map for the sparse file system to locate the requested blocks in any of a data source or the backup data source;
        obtaining the requested blocks from the data source or the backup data source;
        for blocks not included in the block map, obtaining blocks not included in the block map from the sparse file system; and
        fulfilling the request with the obtained blocks.

6. The method according to claim 1, further comprising fulfilling a request for blocks using a copy on write source if the requested blocks have been partially written.

7. The method according to claim 5, wherein the backup data source comprises a distributed hash table provisioned within a cloud.

8. The method according to claim 5, wherein the backup data source comprises one or more of a mirror, an incremental file, and combinations thereof.

9. The method according to claim 1, further comprising mounting the sparse file system as a virtual disk.

10. The method according to claim 1, wherein rendering a sparse file system comprises formatting a portion of a virtual disk into a sparse file.

11. The method according to claim 1, wherein the sparse file system comprises a virtual sparse file system.

12. A system, the system comprising:
    at least one server having a memory that includes executable instructions and a processor executing the instructions, the instructions comprising:
        a rendering module that:
            receives a request to render a portion of file records of a file system stored in a backup data source; and
            renders a sparse file system by allocating block sectors for blocks of the portion of the file records in a formatted sparse file, without having to render the file system entirely;
        an extent mapper that creates a block map for the sparse file system, the block map comprising a map record for each file record included in the sparse file system, the map record comprising extents for blocks associated with a file record, the map record providing a mapping between allocated block sectors for a file record and corresponding blocks associated with a data source, wherein all block sectors for blocks in the formatted sparse file are allocated without writing data associated with the file records into the allocated block sectors; and
        a block retriever module that:
            receives a request for blocks; and
            obtains the requested blocks by:
                reading the block map for the sparse file system to obtain the requested blocks from any of a data source and the backup data source;
                for blocks not included in the block map, obtaining blocks not included in the block map from the sparse file system; and
                fulfilling the request with the obtained blocks, wherein the block retriever module fulfills a request for blocks using copy on write source if the requested blocks have been partially written.

13. The system according to claim 12, wherein the rendering module allocates block sectors for blocks of the portion of the file records in a formatted sparse file.

14. The system according to claim 13, wherein the rendering module allocates block sectors using metadata that comprises extents for blocks included in the portion of the file records.

15. The system according to claim 12, wherein the rendering module renders a sparse file system by formatting a portion of a virtual disk into a sparse file, wherein the sparse file system comprises a virtual sparse file system.

16. The system according to claim 12, wherein the rendering module creates a sparse file system using metadata that includes extents for blocks included in the portion of the file records.

17. A method, comprising:
  storing a backup of a file system in a backup data source;
  receiving a request to render a file of the file system stored in the backup data source;
  requesting blocks from a sparse file system by allocating block sectors for blocks of the file in a formatted sparse file, without having to render the file system entirely, the blocks corresponding to a file; and
  assembling the file by:
    evaluating a block map to obtain the requested blocks from a data source, the block map providing a mapping between allocated block sectors of the sparse file system and corresponding block data in a data source, wherein all block sectors for blocks in the formatted sparse file are allocated without writing data associated with the file into the allocated block sectors;
    for blocks not included in the block map, obtaining blocks not included in the block map from the sparse file system; and
    assembling the obtained blocks to assemble the file.

* * * * *